3,615,054
INJECTORS
Richard J. La Botz, Fair Oaks, Calif., assignor to
Aerojet-General Corporation, Azusa, Calif.
Filed Sept. 24, 1965, Ser. No. 489,970
Int. Cl. B05b 1/14; F23d 13/44
U.S. Cl. 239—553.3                    13 Claims

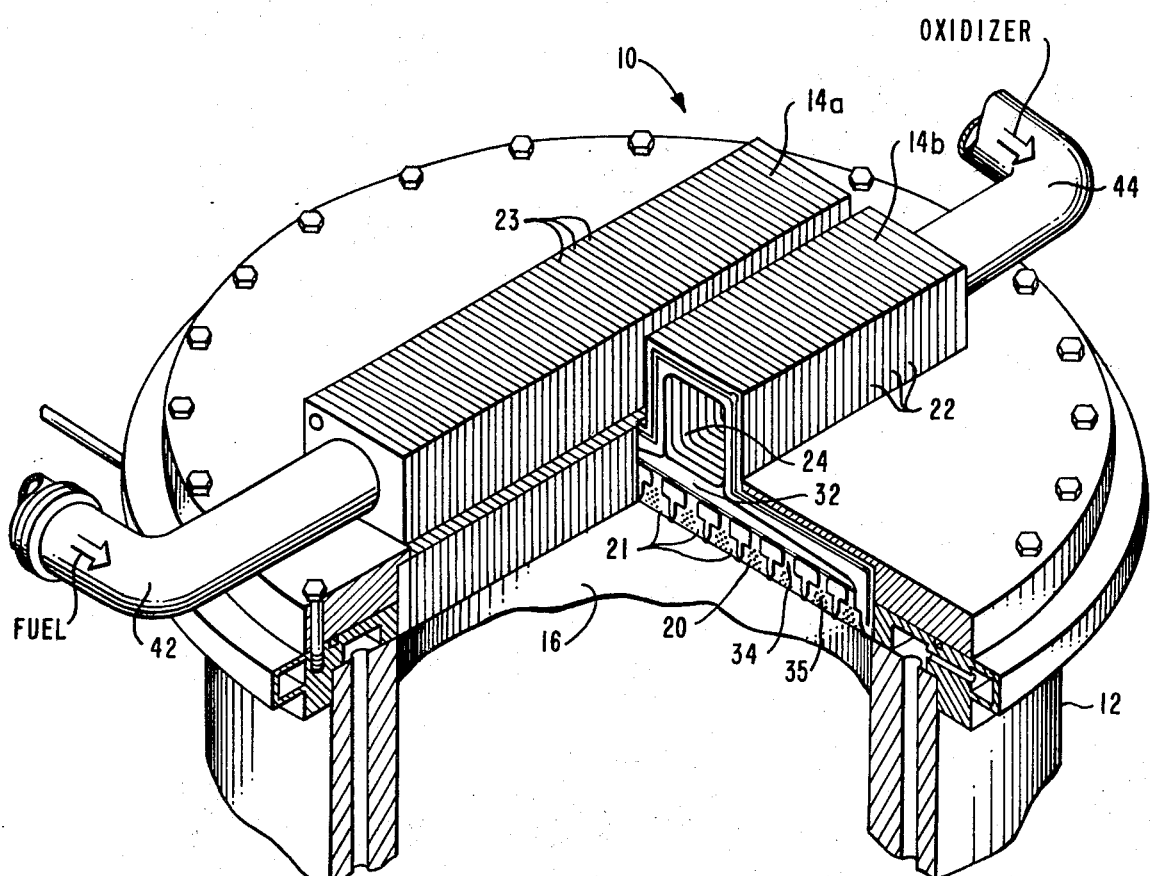
FIG.—1
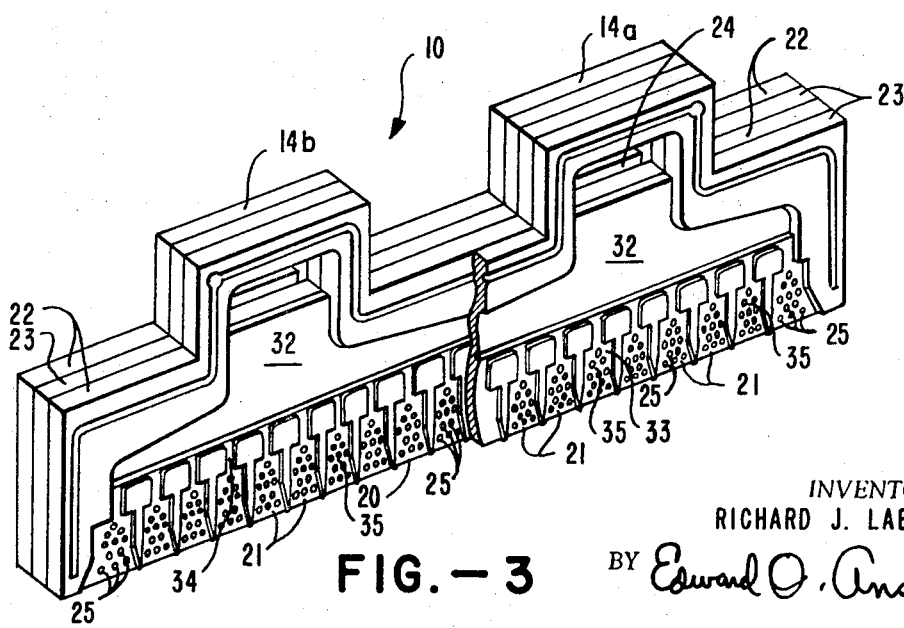
FIG.—3
INVENTOR.
RICHARD J. LABOTZ
BY Edward O. Ansell
ATTORNEY INVENTOR.
RICHARD J. LABOTZ
BY Edward O. Ansell
ATTORNEY United States Patent Office 3,615,054
Patented Oct. 26, 1971

ABSTRACT OF THE DISCLOSURE

This invention relates to improvements in rocket engine injectors.

According to the present invention, a rocket engine injector has an injector face constructed from a plurality of discrete thin wafers, each having planar surfaces and edge surfaces. A controlled pattern of flow passages is formed in one planar surface of each wafer, each flow passage terminating at an edge surface of the wafer. The wafers are joined together in a stack and the passage terminating edge surfaces from the injector face of the injector. The flow passages are adapted to pass liquid propellant therethrough.

According to one form of the invention, the liquid propellant is delivered to the injector face in such a manner that the fuel flows through passages on certain wafers and the oxidizer flows through passages on other wafers.

According to another form of this invention, fuel and oxidizer vents are provided whereby propellant leaks on the planar surfaces of the wafers will be driven from the planar surfaces.

---

This invention relates to new and useful improvements in rocket engine injectors, and has as its object to provide a simple and economical propellant injector, the use of which results in high combustion efficiency, improved throttling capability, superior injector and combustion chamber cooling, and many other advantages which will be hereinafter described.

In rocket engine injectors for introducing fuel and oxidant fluids into combustion chambers, the injectors have generally been classified as to the type of method of mixing or atomizing the fluids, and designated as impingement, spray, splash, premixing or showerhead pattern types. The impingement type of injectors consist of a number of separate holes arranged in such a manner that the resulting propellant streams of the fuel and oxidant intersect each other whereby a full stream of the fuel will impinge the oxidizer stream and break up into small droplets. In the spray or splash types of injectors, the injectors provide conical, cylindrical, or other type of spray sheets of propellant fluids which intersect each other and thereby atomize and mix. The premixing or non-impinging injector is one wherein the fuel and the oxidizer do not impinge but mix largely by diffusion of the propellant vapors and turbulence, that is, fine particles of fuel mix with oxidizer.

These prior methods of propellant mixing and atomization have certain inherent disadvantages. In the impingement type of injectors, for example, the droplet size is of considerable significance in that there is not always assurance of atomization and it is possible that the stream of oxidant will remain uncombined with the fuel or be misdirected against the combustion chamber wall. The spray, splash, and premixing type of injectors are not capable of providing the fine atomization and intimate mixing which is required in order to insure proper combustion at various flow rates of the oxidant and fuel into the combustion chamber for various rocket thrust levels.

Injectors known in the prior art have certain other disadvantages. Less efficient mixing capability and higher injection velocity require lengthened thrust or combustion chamber length, hence reducing rocket performance because of the resulting weight. Cooling problems relating to the injector and thrust chamber have required complex or costly solutions, further detracting from a goal of economical but high performance. Rocket engine throttling means have been complicated, and combustion stability difficult to achieve.

The present invention overcomes the disadvantages of the piror art in that good atomization and intimate mixing is achieved over a wide range in flow rate of the oxidant and fuel into the combustion chamber by providing means for introducing the two fluids into the chamber whereby there is intimate mixing in the combustion chamber which is provided by an injector which is constructed of a plurality of discrete thin platelets or wafers joined together to form a unitary structure or module. Each discrete wafer contains on the surface thereof a very precisely controlled pattern of passages. The wafers are stacked to form a unitary structure, the passageways thereby forming flow paths between propellant manifolds on the back side of the structure and a large number of small injector holes arranged in a precise predetermined pattern in a surface resembling a porous wall which forms the face of the injector. Because of the structure and operation of the injector, there is provided cooling of the injector. This is accomplished by transpiration cooling, a process whereby a surface vessel, wall, container, or the like, in contact with heat energy at a temperature above capabilities of the material forming the surface, etc., can be kept cool by flow of a "cool" fluid through the material toward the heat source.

The resulting rocket engine injector is both simple and economical to fabricate and provides a high degree of propellant atomization and intimate mixing of the fuel and oxidizer without depending upon either high injection velocities, high injector pressure drops, or complex mechanical devices. The excellent atomization and mixing make possible very high combustion efficiencies in virtually any embodiment employing the structures described herein, without necessitating a long and costly development program for each different injector model. In addition, since the injector does not depend upon either velocity or flow rate to give the atomization and mixing, it provides high combustion efficiency over a wide range of flow rate and is well adapted to throttling operation.

The present invention offers significant advantages over conventional injectors in the following respects:

(1) Performance—The excellent atomization and intimate mixing which this invention provides gives combustion efficiencies comparable to those obtained with premixed gaseous injectors, that is, on the order of 98%.

(2) Weight—The low injection velocity and good mixing allows the combustion chamber to be made very short, thereby saving both engine weight and, when used with an upper stage engine, interstage weight.

(3) Development costs and time—Since good atomization, mixing, and combustion uniformity are assured on the first design, no long and expensive injector development program is required in order to obtain a high performing injector.

(4) Cooling—The present invention alleviates the problems of both combustion chamber and injector cooling. With this invention, the injector is by its very nature a transpiration cooled surface. The problems of combustion chamber cooling are also simplified. First, the high degree of local mixture ratio control which this injector makes possible eliminates the possibility of injector streaking and hot spots caused by nonuniform injection. Secondly, the short chamber which this injector makes possible grossly reduces the amount of high heat flux area which must be cooled.

(5) Throttling simplicity—Since the injector does not depend upon injection velocity to obtain combustion efficiency, all that is required for variable thrust operation is a flow modulating valve. Also, in the present invention, no inert gas injection or complex variable area injectors are required. Furthermore, in most applications of the present invention the flow of propellant within the injector will be laminar, thereby providing a linear injector pressure drop-propellant flow relationship, which, in turn, reduces the susceptibility of the rocket motor to low frequency combustion instability at reduced thrust levels.

(6) Combustion stability—Research indicates that the combustion stability of liquid rocket engines may be related to their mixture ratio distribution. This injector offers precise local mixture ratio control.

(7) Flexibility—Due to the basic simplicity and repetitious nature of the design the same technology can be applied to engines of all sizes. Building of micromotors can be done with the same techniques as employed in constructing huge multi-million pound boosters. In addition, large injectors can be fabricated by using a number of smaller, easily constructed modules. Also, injectors can be fabricated in many various shapes.

Other objects and advantages of the present invention will be readily appreciated as the same becomes better understood by reference to the following detailed description when considered in connection with the accompanying drawings wherein:

FIG. 1 is a perspective view, partially broken away, showing a typical injector of the type described as used in a rocket motor;

Figure 2:
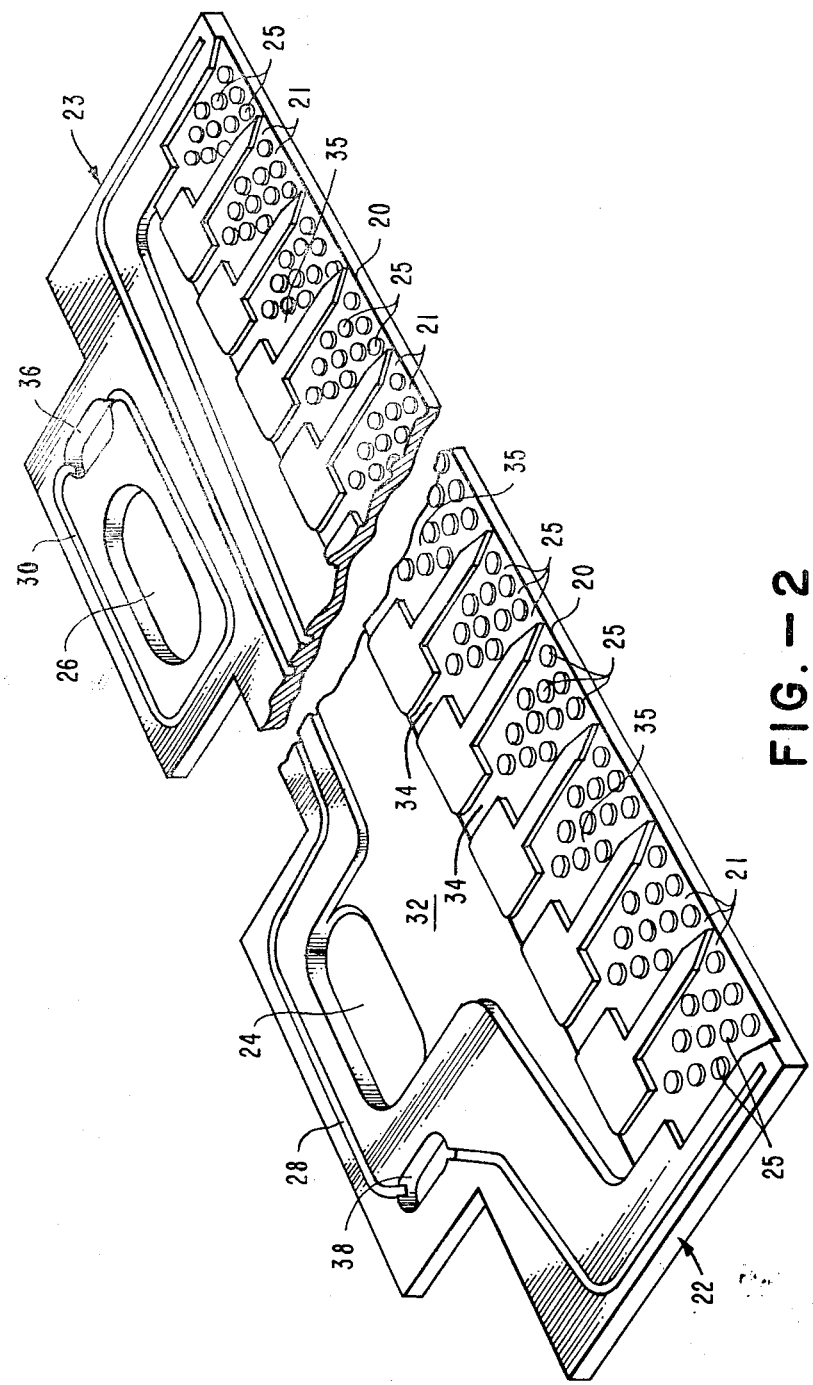
FIG. 2 is a sketch of an oxidizer wafer of the type used in the injector of the present invention; and, FIG. 3 is an isometric view of a plurality of fuel and oxidizer wafers stacked together in alternate order in a segment of an injector assembly.

Referring now to the drawings and more particularly to FIGS. 1, 2 and 3, there is shown a high performing, throttleable injector 10 suitable for use with liquid rocket engines, gas generators, and many other kinds of combustors. The face of the injector 20 resembles a porous wall, containing many thousands of small holes 21 which are several thousandths of an inch across and arranged in a precise, predetermined pattern. The preferred size of injector face holes 21 have hydraulic diameters within the range of 0.0005 inch to 0.020 inch. The term "hydraulic diameter" as used herein means four times the cross-sectional area divided by the wetted perimeter. The term "wetted perimeter" as used herein, means the size of the perimeter of the passage actually wetted by the fluid, which for the purposes of this invention means the actual perimeter size. A typical size is 0.002 inch. The preferred spacing between adjacent fuel and oxidizer holes is 0.001 inch to 0.010 inch. A typical spacing is 0.004 inch. Every hole is connected to either the fuel manifold 14a or oxidizer manifold 14b by means of precisely controlled flow passages, to be later described, which accurately meter the propellant flow to that hole.

When the injector 10 is operating, a fine propellant stream issues from each opening 21. Due to the very small effective diameter of the streams, the injected propellant has a surface to volume ratio equivalent to that of a highly atomized spray, so that the propellant is in an effectively atomized state as it enters the combustion chamber 16. In addition, the close proximity of the very fine fuel and oxidizer streams as they leave the injector 10 assures a degree of intimacy and mixing which approaches that obtainable when injecting premixed gases. Thus, this injector 10 produces both a high degree of atomization and intimate mixing independent of injection velocity.

The injector 10 is formed by stacking and bonding together a large number of very thin sheets of material. A typical injector 10 of this type assembled in a rocket engine 12 is shown in FIG. 1. These thin plates or wafers 22, as shown in FIG. 2, have etched, embossed, or otherwise contain on their surfaces, a very precisely controlled pattern of passages. When the wafers 22 are stacked and bonded together, as shown in FIG. 3, these passages form flow paths passing from manifolds 14a, 14b, on the back side of the injector to the large number of small injector holes 21 on the injector face 20.

In an injector 10 there will be basically two types of wafers, oxidizer wafers 22 and fuel wafers 23. A typical oxidizer wafer 22 is shown in FIG. 2 and is typically 0.007 inch in thickness, although other thicknesses can be employed, dependent upon the application. The wafer 22 shown has four holes passing through it, two large holes 24, 26 forming the oxidizer and fuel manifolds and two small holes forming the oxidizer vent manifold 38 and fuel vent manifold 36. With the injector in operation, the pressurized oxidizer fluid flows from the oxidizer manifold hole 24 on the back side of the injector 10 through the distribution plenum 32 to the oxidizer flow restrictors 34. The flow then passes through the restrictor channels 34 into the flared passage 35 and out into the combustion chamber 16. As is evident from FIG. 2, there will be no flow from the fuel manifold hole 26 to the distribution plenum 32, because there exists no flow passages between them.

The purpose of the flow restrictors 34 shown in the figures is to accurately meter the flow to each injector opening 21 to provide precise mixture ratio control across the face 20 of the injector 10. The preferred hydraulic diameter of the flow restrictors 34 is substantially between 0.0005 inch and 0.010 inch, with a typical hydraulic diameter being 0.002 inch. As a result, of the small hydraulic diameter of these flow restrictor passages 34, the flow through them will in most cases be laminar. The linear flow rate-pressure drop relationship which exists with laminar flow is very beneficial for throttling operation. Since the combustion chamber pressure is proportional to the propellant flow rate, the ratio of propellant injector pressure drop to the thrust chamber pressure will remain essentially constant over a wide thrust range. This feature, not found in turbulent flow high injection velocity injectors, is very instrumental in avoiding low frequency combustion instability at the reduced thrust levels. These flow restrictors 34 are set back from the injector face 20 so that the flow resistance through them will not be influenced by the local heat transfer conditions at the injector face 20. The divergent part or flared passage 35 of each flow channel serves the function of providing a low resistance flow path in the region of which the flow will be subject to influence from the heat transfer conditions on the injector face. Providing this flared passage 35 makes the total flow resistance of each path relatively insensitive to the heat transfer on the injector face 20. Islands 25 serving as separators between adjacent wafers 22, 23, and flow spreaders as shown in FIG. 2, and are an integral part of the pattern of the wafer surface. Holes 21 are formed between adjacent islands 25 and between islands 25 and the adjacent bounding walls of flared passage 35. While the wafers 22, 23 are shown as having flared passageways 35, it is equally possible to construct injectors 10 of the present invention having the injector face 20 at the end of the flow restrictor passages 34. Conventional pipe fittings 42, 44 are attached to the manifolds 14a, 14b simply by making the end wafers extra heavy and welding or brazing the fittings to them.

Since the injector 10 is usually assembled by stacking the wafers 22, 23 in the order fuel-oxidizer-fuel-oxidizer-etc., the oxidizer wafer 22 just described has fuel wafers 23 on either side of it. These fuel wafers 23 are much the same as the oxidizer wafers 22 except that the oxidizer manifold hole 24 is now shut off from the distribution plenum 32 and the fuel manifold hole 26 opens into the distribution plenum 32. The arrangement of the wafers does not necessarily have to be in the sequence previously described. In the case of rocket engines using cryogenic propellants, for example, it may be desirable to alternate several fuel wafers with single oxidizer wafers, due to the low density of some of the fuels which might be used.

The individual wafers 22 may be formed in any one of several different ways. One way known to those skilled in the art is photoetching. With photoetching, the thin metal sheet stack is imprinted with an acid-resistant ink which outlines all the flow passages. The sheet is then immersed in an acid bath which etches out the flow paths at a precisely known, predetermined rate. Several different depths of etch can be obtained on a single sheet of stock simply by repeating the above process with different patterns. In this way it could be possible to make the distribution plenums 32 considerably deeper than the flow restrictor paths 33, 34 to obtain the proper distribution and pressure-drop characteristics. It should be pointed out, however, that it may be equally possible to form the individual wafers 22, 23 either by embossing them or else by electroplating to form the raised areas rather than etching out the depressed areas.

Other means include, but are not limited to, the utilization of a crude etching process in making all but the metering or flow restrictor grooves 33, 34, which are later provided by a scribing process, similar to that used in preparing diffraction gratings. Grooving or channels also can be attained by conventioinal indentation processes or forming rolls. The means just described are well known to those skilled in the art.

Bonding of the wafers 22, 23 together can also be accomplished in several ways. One method is to electroplate to the sheet stock a thin flashing of braze material prior to applying the acid resistant ink. The wafers 22, 23 then will end up with a coating of braze alloy on all the surfaces which contact the adjoining wafers, but with none in any passageway through which propellant flows. The entire injector assembly 10 can then be placed in a furnace and brazed together.

Other methods which might be used for joining the wafers together are diffusion bonding, resistance welding, or simply applying some advanced bonding agent to the contacting surfaces.

There are a number of features to the present invention which are designed to eliminate potential problems encountered in usage of injectors in a rocket environment. Perhaps the most important of these problem-eliminating features are the oxidizer and fuel vent passages 28, 30 and fuel and oxidizer vent manifolds 36, 38. The primary purpose of these passages is to eliminate intermanifold leakage. The fuel vent manifold 36 and oxidizer vent manifold 38 are maintained at a pressure either above or below that of the propellant in the feed manifolds. If the pressure in the vent manifolds is maintained below that of the propellant, then, should any leaks exist at any point between adjacent wafers, this leak will be intercepted by the vent passage 28 and dumped through the vent manifold 38. If the pressure in the vent manifolds is maintained above that of the propellant, then, should any leaks exist at any point between adjacent wafers, the inert pressurizing fluid in the vent manifolds will seep into the propellant system, preventing propellant leakage outward. Thus, the existence of these passages 28, 30, 36, 38 effectively eliminates all danger of any intermanifold leakage.

A second function which these vent passages have is to provide an adequate means for inspecting the injector 10 for leaks. If the injector 10 is pressurized and no flow comes out either of the vent manifolds 36, 38, then the assembly is known to be leak-free.

A prime element of the superior performance of this injector is the very high surface to volume ratio of the injected propellant which is substantially equivalent to that of a highly atomized spray. This is because the injector holes are so small. While previous injectors sought to attain the objectives of intimate mixing through the use of closely spaced small holes, the feeding of oxidizer and fuel to injector holes which were in close proximity to each other was not satisfactorily accomplished. The use of thin platelets with channels herein solves this problem. Since the oxidizer and fuel streams are so small and close to each other, intimate mixing is realized.

Variations and modifications are possible within the scope of the disclosure of this invention, the essence of which is the provision of an injector unit comprising a plurality of ultra-thin discrete discs having on the surface thereon a precisely controlled pattern of passages, the passages joining at one end manifolds adapted to receive propellant, and terminating at their other end at a porous wall-like face member having a large number of small holes arranged in a precise, predetermined pattern. While this invention has been illustrated as operative with a bi-propellant system, it is not necessarily so limited and is equally applicable with monopropellant, tri-propellant, hybrid, or other systems.

The injector of the present invention can be adapted to injector faces of different configurations simply by making the wafers of different geometry and/or length. It should also be pointed out that while this invention is not size-limited, it is particularly well adapted to a modular design approach for very large engines. Use of modules will both simplify the fabrication and reduce unit costs.

Obviously, many modifications and variations of the present invention are possible in the light of the above teachings. It is therefore to be understood that within the scope of the appended claims, the invention may be practiced other than as specifically described.

What is claimed is:

1. In a rocket engine having a combustion chamber, a propellant injector comprising: a plurality of discrete wafers having planar surfaces and edge surfaces; one planar surface of each wafer having a pattern of flow passages therein, said flow passages terminating at an edge surface thereof and forming an opening in said edge surface; said wafers joined together in a stack to form a unitary structure; said plurality of passage-terminating edge surfaces together forming a porous end wall having a plurality of holes arranged in a controlled pattern; means adapted to receive liquid propellant, said plurality of flow passages forming flow paths between said propellant-receiving means and said plurality of holes in said porous end wall; and flow restrictors in said flow passages for metering flow of liquid propellant to each edge surface opening to provide mixture control across the porous end wall of said injector, said flow restrictors providing laminar flow of liquid propellant therethrough.

2. A device as described in claim 1, wherein said means adapted to receive liquid propellant comprises an oxidizer manifold and a fuel manifold.

3. A device as set forth in claim 1, wherein said edge surface holes are of a hydraulic diameter substantially between 0.0005 inch and 0.020 inch.

4. A device as described in claim 3, wherein said edge surface holes have a hydraulic diameter of approximately 0.002 inch.

5. A device as set forth in claim 1, wherein the spacing between adjacent edge surface holes is substantially between 0.001 and 0.010 inch.

6. A device as described in claim 5, wherein the spacing between adjacent edge surface holes is approximately 0.004 inch.

7. A device as described in claim 1, wherein said flow restrictors are set back from said edge surface, whereby the flow resistance through them will be independent of local heat transfer conditions at the edge surface.

8. A device as described in claim 1, wherein the hydraulic diameter of said flow resistors is substantially between 0.0005 inch and 0.010 inch.

9. A device as described in claim 8, wherein said flow restrictors have a hydraulic diameter of approximately 0.02 inch.

10. A device as described in claim 1, wherein said flow passageways are flared.

11. A device as described in claim 1, wherein said wafer planar surfaces include a fuel vent manifold and a fuel vent passage, and an oxidizer vent manifold and an oxidizer vent passage, said oxidizer vent manifold being connected to said oxidizer vent passage and said fuel vent manifold being connected to said fuel vent passage;
   (a) means for maintaining a differential between: said oxidizer vent passage and oxidizer vent manifold pressure, and the pressure in said oxidizer manifold; and the pressure in said fuel vent passage and fuel vent manifold, and the pressure in said fuel manifold;
   (b) whereby any propellant leaks from flow passages existing in the interface between adjacent wafers will be driven from the interface.

12. A device as described in claim 1, wherein said wafer planar surfaces include interconnected propellant vent manifold and propellant vent passages adapted to be maintained at a pressure different from that of said liquid propellant-receiving means, whereby any propellant leaks from the flow passageways existing in the interface between adjacent wafers will be driven from said interface.

13. A fluid injector comprising:
   (a) a plurality of discrete wafers having planar surfaces and edge surfaces,
   (b) one planar surface of each wafer having a controlled pattern of flow passages thereon,
   (c) said flow passages terminating in an edge surface thereof,
   (d) said wafers joined together in a stack to form a unitary structure,
   (e) said plurality of passage-terminating edge surfaces together forming a surface having a number of holes arranged in a controlled pattern to effectively form a porous end wall,
   (f) an oxidizer manifold and a fuel manifold associated with said unitary structure,
   (g) said plurality of flow passages forming flow paths between said propellant-receiving means and said number of holes in said plurality of passage-terminating edge surfaces,
   (h) said edge surface holes having a hydraulic diameter substantially between 0.0005 inch and 0.020 inch having a spacing between adjacent holes of substantially between 0.001 and 0.010 inch,
   (i) said flow passages having flared flow restrictor passageways of a hydraulic diameter substantially between 0.0005 inch and 0.010 inch therein to meter the flow to each edge surface hole,
   (j) said wafer planar surfaces also including connected propellant vent manifolds and propellant vent passages which are adapted to be maintained at a pressure differential from that of said oxidizer and fuel manifolds.

References Cited
UNITED STATES PATENTS

| | | | |
|---|---|---|---|
| 944,440 | 12/1909 | Tonides | 239—555 |
| 2,484,123 | 10/1949 | Scherl | 239—555 |
| 2,735,482 | 2/1956 | Tuttle | 239—557 |
| 2,928,236 | 3/1960 | Kircher et al. | 60—39.74 (R.L.) |
| 2,940,259 | 6/1960 | Mantler | 60—258 (R.L.) |

SAMUEL FEINBERG, Primary Examiner

U.S. Cl. X.R.

239—553.5, 568, 555, 557, 590.3, 590.5; 60—258